(12) United States Patent
Yang et al.

(10) Patent No.: US 11,183,714 B2
(45) Date of Patent: Nov. 23, 2021

(54) HYBRID METAL-ORGANIC FRAMEWORK SEPARATORS FOR ELECTROCHEMICAL CELLS

(71) Applicant: GM Global Technology Operations LLC, Detroit, MI (US)

(72) Inventors: Li Yang, Troy, MI (US); Mei Cai, Bloomfield Hills, MI (US); Anne M. Dailly, West Bloomfield, MI (US); Fang Dai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 488 days.

(21) Appl. No.: 15/710,326

(22) Filed: Sep. 20, 2017

(65) Prior Publication Data

US 2019/0089006 A1   Mar. 21, 2019

(51) Int. Cl.
*H01M 50/446* (2021.01)
*H01M 10/14* (2006.01)
(Continued)

(52) U.S. Cl.
CPC .............. *H01M 10/14* (2013.01); *C07F 1/02* (2013.01); *C07F 1/08* (2013.01); *C07F 3/06* (2013.01); *C07F 5/003* (2013.01); *C07F 5/02* (2013.01); *H01M 4/525* (2013.01); *H01M 4/621* (2013.01); *H01M 10/0525* (2013.01);
(Continued)

(58) Field of Classification Search
None
See application file for complete search history.

(56) References Cited

U.S. PATENT DOCUMENTS 8,974,946 B2   3/2015   Cai et al.
9,123,939 B2   9/2015   Xiao et al.
(Continued)

FOREIGN PATENT DOCUMENTS

CN   109524605 A   3/2019
DE   102018123086 A1   3/2019
(Continued)

OTHER PUBLICATIONS

Brian M. Wiers et al.; "A Solid Lithium Electrolyte via Addition of Lithium Isopropoxide to a Metal-Organic Framework With Open Metal Sites"; Journal of the American Chemical Society; Aug. 30, 2011; pp. 14522-.14525.
(Continued)

*Primary Examiner* — Yoshitoshi Takeuchi
(74) *Attorney, Agent, or Firm* — Harness, Dickey & Pierce, P.L.C.

(57) ABSTRACT

A hybrid separator for an electrochemical cell is provided, along with methods of making the hybrid separator. The hybrid separator includes a first metal-organic framework comprising copper and having a plurality of first pores and a second distinct metal-organic framework comprising indium or zinc and having a plurality of second pores. The hybrid separator is capable of adsorbing one or more lithium salts in at least one of the plurality of first pores or the plurality of second pores so as to be ionically conductive. The hybrid separator may have a conductivity greater than or equal to about 0.1 mS/cm to less than or equal to about 1 mS/cm and is substantially free of any polymeric binder.

18 Claims, 3 Drawing Sheets

(51) Int. Cl.
*C07F 1/02* (2006.01)
*C07F 5/00* (2006.01)
*C07F 1/08* (2006.01)
*C07F 5/02* (2006.01)
*H01M 10/0568* (2010.01)
*C07F 3/06* (2006.01)
*H01M 4/525* (2010.01)
*H01M 4/62* (2006.01)
*H01M 10/0525* (2010.01)
*C01B 11/18* (2006.01)
*C01B 35/06* (2006.01)
*C01D 15/00* (2006.01)

(52) U.S. Cl.
CPC ..... *H01M 10/0568* (2013.01); *H01M 50/446* (2021.01); *C01B 11/18* (2013.01); *C01B 35/063* (2013.01); *C01D 15/00* (2013.01); *C07F 5/00* (2013.01); *H01M 2300/0085* (2013.01)

(56) References Cited

U.S. PATENT DOCUMENTS

| | | | |
|---|---|---|---|
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,362,552 | B2 | 6/2016 | Sohn et al. |
| 9,437,871 | B2 | 9/2016 | Zhou et al. |
| 9,742,028 | B2 | 8/2017 | Zhou et al. |
| 9,896,763 | B2 | 2/2018 | Dadheech et al. |
| 10,326,166 | B2 | 6/2019 | Yang et al. |
| 10,381,170 | B2 | 8/2019 | Dai et al. |
| 2014/0265557 | A1 | 9/2014 | Huang et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0104690 | A1 | 4/2015 | Xiao et al. |
| 2015/0162583 | A1 | 6/2015 | Dadheech et al. |
| 2015/0236324 | A1 | 8/2015 | Xiao et al. |
| 2015/0349307 | A1 | 12/2015 | Dadheech et al. |
| 2016/0020491 | A1 | 1/2016 | Dai et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0218342 | A1 | 7/2016 | Xiao et al. |
| 2016/0254567 | A1 | 9/2016 | Cai et al. |
| 2017/0141382 | A1 | 5/2017 | Dadheech et al. |
| 2017/0141383 | A1 | 5/2017 | Dadheech et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |
| 2018/0226682 | A1* | 8/2018 | Lu ............ H01M 10/054 |
| 2018/0309165 | A1 | 10/2018 | Yersak et al. |
| 2018/0309166 | A1 | 10/2018 | Yersak et al. |
| 2018/0375148 | A1 | 12/2018 | Yersak et al. |

FOREIGN PATENT DOCUMENTS

| | | |
|---|---|---|
| WO | WO-2014182281 A1 | 11/2014 |
| WO | WO-2015126649 A1 | 8/2015 |

OTHER PUBLICATIONS

Rob Ameloot et al.; "Ionic Conductivity in the Metal-Organic Framework UiO-66 by Dehydration and Insertion of Lithium tert-Butoxide"; Chemistry A European Journal 2013, 19; pp. 5533-5536.

Li Yang et al.; U.S. Appl. No. 15/070,677, filed Mar. 15, 2016 entitled "Primer Surface Coating for High-Performance Silicon-Based Electrodes"; 50 pages.

Li Yang et al.; U.S. Appl. No. 15/085,510, filed Mar. 30, 2016 entitled "Negative Electrode Including a Polymeric Single-Ion Conductor Coating"; 23 pages.

Li Yang et al.; U.S. Appl. No. 15/237,378, filed Aug. 15, 2016 entitled "Gel Electrolytes and Precursors Thereof"; 23 pages.

Xingcheng Xiao et al.; U.S. Appl. No. 15/160,377, filed May 20, 2016 entitled "Polymerization Process for Forming Polymeric Ultrathin Conformal Coatings on Electrode Materials"; 45 pages.

Gayatri V. Dadheech et al.; U.S. Appl. No. 15/154,358, filed May 13, 2016 entitled "Novel Particle Reactor for Atomic Layer Deposition (ALD) and Chemical Vapor Deposition (CVD) Processes"; 38 pages.

\* cited by examiner

HYBRID METAL-ORGANIC FRAMEWORK SEPARATORS FOR ELECTROCHEMICAL CELLS

INTRODUCTION

This section provides background information related to the present disclosure which is not necessarily prior art.

The present disclosure relates to a hybrid separator for an electrochemical cell that cycles lithium ions. The hybrid separator includes a first metal-organic framework (MOF) having a plurality of first pores and a distinct second metal-organic framework (MOF) having a plurality of second pores. One or more lithium salts may be adsorbed or absorbed in at least one of the plurality of first pores or the plurality of second pores so as to be ionically conductive.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. By way of non-limiting example, cathode materials for lithium-ion batteries typically comprise an electroactive material which can be intercalated or alloyed with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). The negative electrode may also be made of a lithium-containing material, such as metallic lithium, so that the electrochemical cell is considered a lithium metal battery or cell.

Metal-organic frameworks (MOFs) are promising separator materials because of their ordered porous structure and high surface area. However, metal-organic frameworks (MOFs) are generally synthesized in powder form and, consequently, require densification for practical applications. For example, in the instance of lithium-ion battery separators, metal-organic frameworks (MOFs) should be capable of forming a film or membrane shape that is further capable of accommodating (e.g., absorbing/adsorbing) electrolyte within its porous structure. In many instances, however, metal-organic frameworks (MOFs), alone or in combination, for example, with an absorbed or adsorbed electrolyte, cannot be shaped or densified without addition of a polymer binder. Adding a binder, however, may compromise the integrity of the metal-organic frameworks (MOFs) and the functionality or behavior of the lithium-ion battery. Accordingly, it would be desirable to develop separator materials comprising metal-organic frameworks (MOFs) that can form strong self-forming/self-standing films or sheets independently or without addition of a binder.

SUMMARY

This section provides a general summary of the disclosure, and is not a comprehensive disclosure of its full scope or all of its features.

In various aspects, the present disclosure provides a hybrid separator for an electrochemical cell that cycles lithium ions. The hybrid separator may be in a sheet form and may include a first metal-organic framework (MOF) and a second distinct metal-organic framework (MOF). The first metal-organic framework (MOF) may include copper (Cu) and may have a plurality of first pores. The second metal-organic framework (MOF) may include indium (In) or zinc (Zn) and may have a plurality of second pores. The hybrid separator may be capable of adsorbing one or more lithium salts in at least one of the plurality of first pores or the plurality of second pores so as to be ionically conductive.

In one aspect, the hybrid separator is substantially free of any polymeric binder.

In one aspect the hybrid separator may include greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF).

In one aspect the hybrid separator may adsorb greater than or equal to about 10 wt. % to less than or equal to about 85 wt. % of a total combined mass of the hybrid separator having adsorbed the one or more lithium salts.

In one aspect, the one or more lithium salts may include a first lithium salt and a second lithium salt. The plurality of first pores of the hybrid separator may adsorb the first lithium salt, and the plurality of second pores of the hybrid separator may adsorb the second distinct lithium salt.

In one aspect, one of the one or more lithium salts may have an anion volume that may be less than an average pore diameter of at least one of the at least one of the plurality of first pores or the plurality of second pores.

In one aspect, the one or more lithium salts may be selected from the group consisting of: lithium tetrafluoroborate ($LiBF_4$), lithium perchlorate ($LiClO_4$), and combinations thereof In one aspect, greater than or equal to about 85 volume % of the plurality of first pores is filled by the one or more lithium salts.

In one aspect, greater than or equal to about 85 volume % of the plurality of first pores is filled by the one or more lithium salts and greater than or equal to about 85 volume % of the plurality of second pores of the second metal-organic framework (MOF) may be filled by one or more lithium salts.

In one aspect, the hybrid separator including one or more adsorbed lithium salts may have a conductivity of greater than or equal to about 0.1 mS/cm to less than or equal to about 1 mS/cm.

In one aspect, the first metal-organic framework (MOF) may include $Cu_3btc_2$ (HKUST-1) and the second metal-organic framework (MOF) may include $(In_3O)(OH)(ADC)_2(In)_2$.

In one aspect, the first metal-organic framework (MOF) may include $Cu_3btc_2$ (HKUST-1) and the second metal-organic framework (MOF) may include $Zn_4O(BDC)_3$ (MOF-5; IRMOF-1).

In one aspect, the hybrid separator may further include a third plurality of pores defined between the first metal-organic framework (MOF) and/or the second metal-organic framework (MOF) an the hybrid separator may be capable of adsorbing the one or more lithium salts in at least one or the plurality of first pores, the plurality of second pores, or the plurality of third pores so as to be ionically conductive.

In another variation, the present disclosure provides an electrochemical cell that cycles lithium ions. The electrochemical cell may include a positive electrode, a negative electrode opposing the positive electrode, and an ionically conductive separator disposed therebetween. The ionically conductive separator may have a conductivity greater than or equal to about 0.1 mS/cm to less than or equal to about 1 mS/cm and may include a first metal-organic framework (MOF) and a second distinct metal-organic framework (MOF). The first metal-organic framework (MOF) may include copper (Cu) and may have a plurality of first pores, and the second metal-organic framework (MOF) may include indium (In) or zinc (Zn) and may have a plurality of second pores. At least one of the plurality of first pores or the plurality of second pores may include one or more adsorbed lithium salts.

In one aspect, the ionically conductive separator may be substantially free of any polymeric binder.

In one aspect, the ionically conductive separator may include greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF).

In one aspect, the ionically conductive separator may include greater than or equal to about 10 wt. % to less than or equal to about 85 wt. % of a total combined mass of the ionically conductive separator having adsorbed the one or more lithium salts.

In one aspect, the one or more lithium salts may be selected from the group consisting of: lithium tetrafluoroborate ($LiBF_4$), lithium perchlorate ($LiClO_4$), and combinations thereof.

In one aspect, greater than or equal to about 85 volume % of the plurality of first pores is filled by the one or more lithium salts.

In one aspect, greater than or equal to about 85 volume % of the plurality of first pores is filled by the one or more lithium salts and greater than or equal to about 85 volume % of the plurality of second pores of the second metal-organic framework (MOF) may be filled by one or more lithium salts.

In one aspect, the first metal-organic framework (MOF) may include $Cu_3btc_2$ (HKUST-1) and the second metal-organic framework (MOF) may include $(In_3O)(OH)(ADC)_2(In)_2$.

In one aspect, the first metal-organic framework (MOF) may include $Cu_3btc_2$ (HKUST-1) and the second metal-organic framework (MOF) may include $Zn_4O(BDC)_3$ (MOF-5; IRMOF-1).

In another variation, the present disclosure provides a method for forming a hybrid separator for an electrochemical cell that cycles lithium ions. The method may include forming a sheet by pressing an ionically conductive material, including a first metal-organic framework (MOF) and a second metal-organic framework (MOF). The first metal-organic framework (MOF) may include copper (Cu) and may have a plurality of first pores. The second metal-organic framework (MOF) may include indium (In) or zinc (Zn) and may have a plurality of second pores. One or more lithium salts may be adsorbed in at least one of the plurality of first pores or the plurality of second pores.

In one aspect, the method may further include forming a precursor material by combining a plurality of first particles of the first metal-organic framework (MOF) and a plurality of second particles of the second distinct metal-organic framework (MOF).

In one aspect, the method may further include soaking the plurality of first particles in a first electrolyte and soaking the plurality of second particles in a second electrolyte. The first and second electrolytes may include one or more lithium salts in one or more solvents. The pre-soaked first and second particles may be subsequently mixed to form the precursor material.

In one aspect, the method may further include mixing the plurality of first particles and the plurality of second particles in a dry form and subsequently soaking the mixture in an electrolyte including one or more lithium salts in one or more solvents to form the precursor material.

In one aspect, the method may further include drying the precursor material and pressing the dried mixture to densify and shape the hybrid separator. A force of greater than or equal to about 1,000 psi to less than or equal to about 10,000 psi may be applied during pressing.

In one aspect, the formed hybrid separator may be substantially free of any polymeric binder.

In one aspect, the formed hybrid separator may include greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF).

In one aspect, greater than or equal to about 85 volume % of the plurality of first pores is filled by the one or more lithium salts.

In one aspect, greater than or equal to about 85 volume % of the plurality of first pores is filled by the one or more lithium salts and greater than or equal to about 85 volume % of the plurality of second pores of the second metal-organic framework (MOF) may be filled by one or more lithium salts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
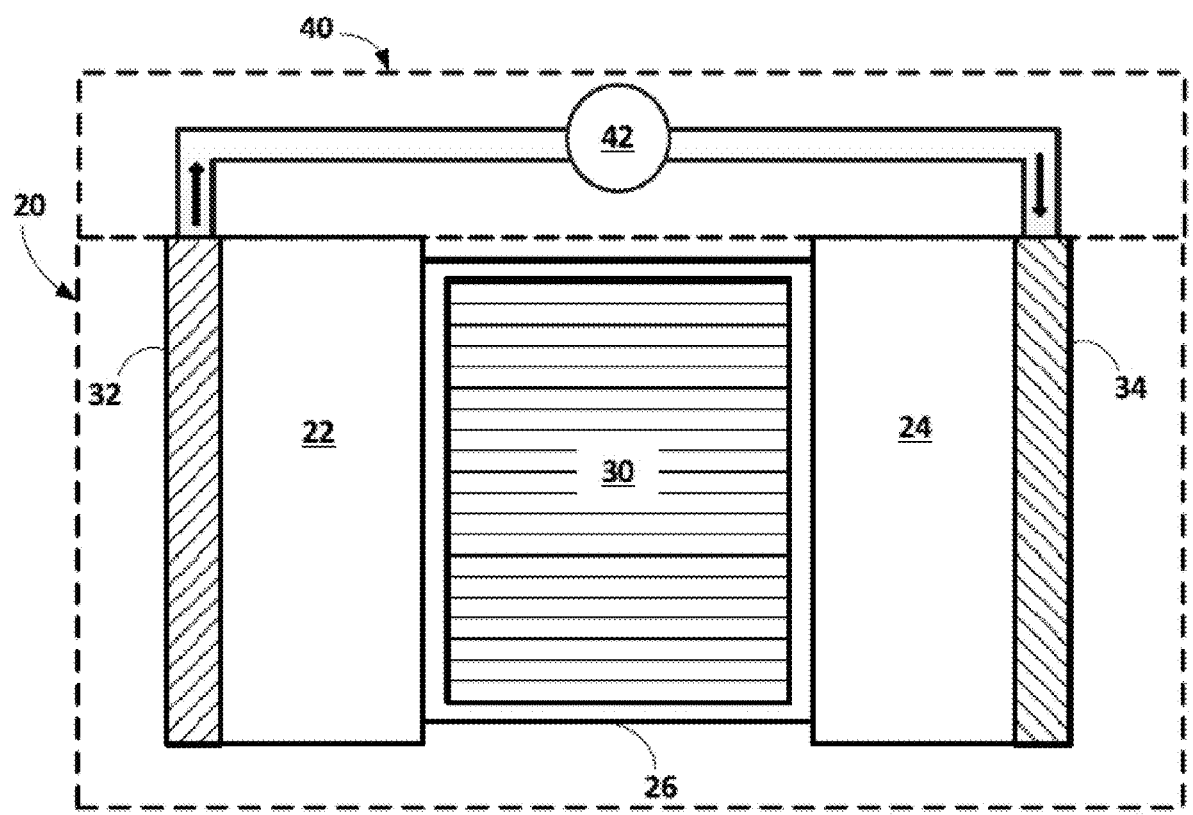
FIG. 1 is a schematic of an exemplary electrochemical battery cell including a hybrid separator.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion or more particularly lithium-metal batteries, which may be used in vehicle applications. However, the present technology may also be used in other electrochemical devices; especially those that comprise lithium, such as lithium-sulfur batteries. Thus, the discussion of a lithium-ion battery herein is non-limiting.

An exemplary and schematic illustration of a battery 20 that cycles lithium ions is shown in FIG. 1. Battery 20 includes a negative electrode 22, a positive electrode 24, and a porous separator 26 disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 25. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, the positive active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum (Al) or any other appropriate electrically conductive material known to those of skill in the art.

In various aspects, the negative electrode 22 includes an electroactive material as a lithium host material capable of functioning as a negative terminal of a lithium-ion battery. The negative electrode 22 may thus include the electroactive lithium host material and optionally another electrically conductive material, as well as one or more polymeric binder materials to structurally hold the lithium host material together. For example, in certain instances, the negative electrode 22 may include an active material including graphite, silicon (Si), tin (Sn), or other negative electrode particles intermingled with a binder material selected from the group consisting of: polyvinylidene difluoride (PVDF), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain instances, lithium-titanium anode materials are contemplated, such as $Li_{4+x}Ti_5O_{12}$, where $0 \leq x \leq 3$, including lithium titanate ($Li_4Ti_5O_{12}$) (LTO). The negative electrode current collector 32 may be formed from copper (Cu) or any other appropriate electrically conductive material known to those of skill in the art.

In various aspects, the positive electrode 24, the negative electrode 22, and the separator 26 may each include an electrolyte solution or system 30, capable of conducting lithium ions between the negative electrode 22 and the positive electrode 24. In certain aspects, the electrolyte 30 may be a non-aqueous liquid electrolyte solution that includes one or more lithium salts dissolved in an organic solvent or a mixture of organic solvents. In certain variations, the electrolyte 30 may be a 1M solution of one or more lithium salts in one or more organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium trigluoromethanesulfonimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

In various aspects, the separator 26 may be hybrid separator including two distinct metal-organic framework (MOF) materials. Metal-organic frameworks are hybrid, porous, crystalline solids that result from the three-dimensional (3-D) covalent connection of inorganic clusters using organic linkers. In certain variations, the separator 26 may include a first metal-organic framework (MOF) having a plurality of first internal pores and a second distinct metal-organic framework (MOF) having a plurality of second internal pores. Internal pores include those formed on various surfaces of each metal-organic framework (MOF) structure, including both internal surfaces and potentially external or exposed surfaces. In certain other variations, depending on the packing density of the first metal-organic framework (MOF) and the second metal-organic framework (MOF) in the separator 26, the separator 26 may further include a plurality of third interstitial pores defined between the first metal-organic framework (MOF) and/or the second metal-organic framework (MOF).

At least one of the first metal-organic framework (MOF) or the second metal-organic framework (MOF) maintains a cohesive shape in independent form. By combining a first metal-organic framework (MOF) with at least one other metal-organic framework (MOF) that can bind easily (e.g., capable of forming a strong self-standing pellet or membrane), a hybrid separator 26 may be formed that is capable of being shaped and therefore does not require the presence of any polymeric binders. In this manner, the hybrid metal-organic framework (MOF) separator (e.g., 26) according to certain aspects of the present disclosure is substantially free of potentially harmful or inactive polymeric binders and provides enhanced or improved mechanical stability. Comparatively, certain metal-organic frameworks (MOFs) are unable to self-bind to form structural components and, thus, require potentially harmful polymeric binders to retain a plurality of metal-organic framework (MOF) particles together as they are shaped. Further, in various instances, the hybrid metal-organic framework (MOF) separator (e.g., 26) according to certain aspects of the present disclosure may be capable of preventing or delaying dendrite formation because of increased mechanical performance as compared to a general polyolefin based separator.

The shaped hybrid separator 26 is capable of adsorbing one or more lithium salts of the electrolyte 30 in at least one of the plurality of first pores, the plurality of second pores, or the plurality of third pores so to form ionically conductive adsorbed metal-organic frameworks (AMOF). In various instances, the hybrid separator 26 may have a conductivity greater than or equal to about 0.1 mS/cm to less than or equal to about 1 mS/cm, optionally greater than or equal to about 0.2 mS/cm to less than or equal to about 1 mS/cm, optionally greater than or equal to about 0.2 mS/cm to less than or equal to about 0.8 mS/cm, optionally greater than or equal to about 0.2 mS/cm to less than or equal to about 0.93 mS/cm, and in certain aspects, greater than or equal to about 0.25 and less than or equal to about 0.76 mS/cm. In various instances, the separator 26 may include greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF). In various instances, the separator 26 may adsorb greater than or equal to about 2 wt. % to less than or equal to about 85 wt. % of the total combined mass of the separator 26 having adsorbed one or more lithium salts.

The first metal-organic framework (MOF) may have a first total pore volume of greater than 0 $cm^3/g$ to less than or equal to about 2 $cm^3/g$, optionally greater than or equal to about 0.2 $cm^3/g$ to less than or equal to about 1.9 $cm^3/g$, optionally greater than or equal to about 0.5 $cm^3/g$ to less than or equal to about 1.8 $cm^3/g$, optionally greater than or equal to about 0.6 $cm^3/g$ to less than or equal to about 1.7 $cm^3/g$, and in certain aspects, greater than or equal to about 0.9 $cm^3/g$ to less than or equal to about 1.4 $cm^3/g$. The second metal-organic framework (MOF) may have a second total pore volume of greater than 0 $cm^3/g$ volume of greater than 0 $cm^3/g$ to less than or equal to about 2 $cm^3/g$, optionally greater than or equal to about 0.2 $cm^3/g$ to less than or equal to about 1.9 $cm^3/g$, optionally greater than or equal to about 0.5 $cm^3/g$ to less than or equal to about 1.8 $cm^3/g$, optionally greater than or equal to about 0.6 $cm^3/g$ to less than or equal to about 1.7 $cm^3/g$, and in certain aspects, greater than or equal to about 0.9 $cm^3/g$ to less than or equal to about 1.4 $cm^3/g$. In various instances, greater than or equal to about 75% of the first total pore volume (e.g., open volume) of the first metal-organic framework (MOF) and/or of the second total pore volume of the second metal-organic framework (MOF) may be filled by the one or more lithium salts. In various other instances, greater than or equal to about 75% of a total open volume in the separator, including the first total pore volume of the first metal-organic framework (MOF), of the second total pore volume of the second metal-organic framework (MOF), and/or of the third total interstitial pores may be filled by the one or more lithium salts.

In certain aspects, "substantially all" of at least one of the first total internal pore volume of the first metal-organic framework (MOF) and/or of the second total internal pore volume of the second metal-organic framework (MOF), may be filled by the one or more lithium salts, meaning that optionally greater than or equal to about 85%, optionally greater than or equal to about 90%, optionally greater than or equal to about 95%, optionally greater than or equal to about 97%, optionally greater than or equal to about 98%, and in certain aspects, greater than about 99% of the first total internal pore volume of the first metal-organic framework (MOF) and/or of the second total internal pore volume of the second metal-organic framework (MOF) may be filled by the one or more lithium salts. In certain other aspects, "substantially all" of at least one of the first total internal pore volume of the first metal-organic framework (MOF), of the second total internal pore volume of the second metal-organic framework (MOF), and/or of interstitial pores defined between the first metal-organic framework (MOF) and/or the second metal-organic framework (MOF) may be filled by the one or more lithium salts, meaning that optionally greater than or equal to about 85%, optionally greater than or equal to about 90%, optionally greater than or equal to about 95%, optionally greater than or equal to about 97%, optionally greater than or equal to about 98%, and in certain aspects, greater than about 99% of the first total internal pore volume of the first metal-organic framework (MOF), of the second total internal pore volume of the second metal-organic framework (MOF), and/or of the interstitial pores defined between the first metal-organic framework (MOF) and/or the second metal-organic framework may be filled by the one or more lithium salts.

The one or more lithium salts adsorbed (or absorbed) in at least one of the plurality of first pores and/or the plurality of second pores (e.g., on a surface of the pore) may respectively have an anion volume that is less than an average pore diameter or width of at least one of the plurality of first pores or the plurality of second pores. The first and second metal-organic frameworks (MOFs) may have internal pore diameters or widths of greater than or equal to about 2 nm to less than or equal to about 50 nm. By way of non-limiting example, the one or more lithium salts may be selected from the group consisting of: lithium tetrafluoroborate ($LiBF_4$) (e.g., having anion volume of about 51 $Å^3$), lithium perchlorate ($LiClO_4$) (e.g., having anion volume of about 63 $Å^3$), and combinations thereof. In various instances, the plurality of first pores of the separator 26 may adsorb a first lithium salt of the one or more lithium salts and the plurality of second pores of the separator 26 may adsorb a second lithium salt of the one or more lithium salts. In various other instances, the plurality of first pores of the separator 26 may adsorb a first lithium salt of the one or more lithium salts, the plurality of second pores of the separator 26 may adsorb a second lithium salt of the one or more lithium salts, and the plurality of third pores of the separator 26 may adsorb a third lithium salt of the one or more lithium salts.

In various instances, the first metal-organic framework (MOF) may include copper (Cu) and the second metal-organic framework (MOF) may include indium (In). The copper-based first metal-organic framework (MOF) may provide a structural base for the hybrid metal-organic framework (MOF) material combination. The copper-based first metal-organic framework (MOF) may maintain a cohesive shape in independent form (e.g., without need for any polymeric binder). The indium-based second metal-organic framework (MOF) may enhance or improve the conductivity of the hybrid metal-organic framework (MOF) material combination, for example, by adsorbing lithium salt. By way of non-limiting example, the first metal-organic framework (MOF) may include $Cu_3btc_2$ (HKUST-1), which may be synthesized using copper nitrate ($Cu(NO_3)_2$) and benzene-1,3,5-tricarboxylic acid ($H_3btc$). $Cu_3btc_2$ (HKUST-1) may have an internal pore diameter or width less than or equal to about 1 nm and a total internal pore volume of about $$0.617 \frac{cm^3}{g} \pm 20\%.$$

In various instances, the pore diameter of $Cu_3btc_2$ (HKUST-1) is determined using a distribution analysis method that is based on nonlocal density functional theory for the interpretation of $N_2$ or Argon adsorption isotherm. Further, $Cu_3btc_2$ (HKUST-1) may have a specific surface area (Brunauer-Emmett-Teller (BET) $N_2$) of about 1585

$$\frac{m^2}{g}.$$

The second metal-organic framework (MOF) may include $(In_3O)(OH)(ADC)_2(In)_2$, which may be synthesized using indium nitrate $(In(NO_3)_3)$ and $H_2adc$ comprising 4,4'-azodibenzoic acid $(C_{14}H_{10}N_2O_4)$ and isonicotinic acid $(C_6H_5NO_2)$. $(In_3O)(OH)(ADC)_2(In)_2$ may have an internal pore diameter or width greater than or equal to about 1.5 nm to less than or equal to about 5 nm and a total internal pore volume of about $$0.66 \frac{cm^3}{g} \pm 20\%.$$

Further, $(In_3O)(OH)(ADC)_2(In)_2$ may have a specific surface area (Brunauer-Emmett-Teller (BET) $N_2$) of about $$1828 \frac{m^2}{g}.$$

In various other instances, the first metal-organic framework (MOF) may include copper (Cu) and the second metal-organic framework (MOF) may include zinc (Zn). The copper-based first metal-organic framework (MOF) may provide a structural base for the hybrid MOF material combination. The copper-based first metal-organic framework (MOF) may maintain a cohesive shape in independent form (e.g., without need for any polymeric binder). The zinc-based second metal-organic framework (MOF) may enhance or improve the conductivity of the combination. By way of non-limiting example, the first metal-organic framework (MOF) may include $Cu_3btc_2$ (HKUST-1) described above, which may function as a binder. The second metal-organic framework (MOF) may include $Zn_4O(BDC)_3$ (MOF-5; IRMOF-1), which may be synthesized using zinc nitrate $(Zn(NO_3)_2)$ and benzene-1,4-dicarboxylic acid $(H_2bdc)$. $Zn_4O(BDC)_3$ (MOF-5; IRMOF-1) may have an internal pore diameter or width greater than or equal to about 0.5 nm to less than or equal to about 1.5 nm and a total internal pore volume of about $$1.3 \frac{cm^3}{g} \pm 20\%.$$

Further, $Zn_4O(BDC)_3$ (MOF-5; IRMOF-1) may have a specific surface area (Brunauer-Emmett-Teller (BET) $N_2$) of about 3141

$$\frac{m^2}{g}.$$

Figure 2:
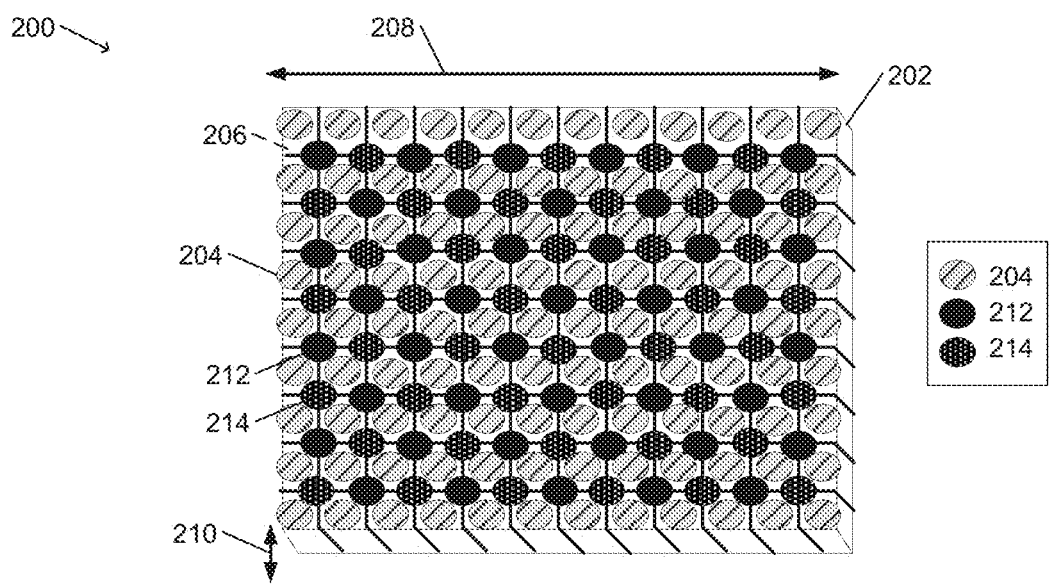
FIG. 2 is a schematic depiction of a porous hybrid separator sheet prepared in accordance with certain aspects of the present disclosure.

As noted, in various instances, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package. As seen in FIG. 2, a hybrid separator 200 comprising a first metal-organic framework (MOF) 212 and a second metal-organic framework (MOF) 214 described above may form a sheet 202 having a laminar structure like a film or membrane that is porous and capable of accommodating (e.g., absorbing/adsorbing) one or more lithium salts 204 of an electrolyte (e.g., 30) within its porous structure. In particular, as discussed above, the porous structure of the sheet 202 may include interstitial pores 206 defined between the first and/or second metal-organic frameworks (MOFs) 212, 214 and/or internal pores (not shown) defined within the first and second metal-organic frameworks (MOFs) 212, 214, respectively. As discussed above, the first metal-organic framework (MOF) 212 and the second metal-organic framework (MOF) 214 each comprise porous material or materials defining internal pores therein. Thus, the one or more lithium salts 204 may be adsorbed on internal pore surfaces of the first metal-organic framework (MOF) 212 and/or internal pore surfaces of the second metal-organic framework (MOF) 214 (not shown in FIG. 2) and depending on the packing density of the first and second metal-organic frameworks (MOFs) 212, 214 the one or more lithium salts 204 may also be present in interstitial spaces between or on an exterior of the first metal-organic framework (MOF) 212 and/or of the second metal-organic framework (MOF) 214, as shown in FIG. 2.

In various instances, the hybrid separator 200 may have an aspect ratio of greater width 208 to height 210, wherein a surface area of a side corresponding to a height 210 (e.g., thickness) of the hybrid separator 200 is substantially smaller than a surface area of a width (e.g. major surface) 208 of the hybrid separator 200. A major surface 208 of the hybrid separator 200 being defined as having the greater dimension or surface area than other surfaces of the hybrid separator 200. An aspect ratio (AR) for sheet shapes may generally be defined as $$AR = \frac{H}{W},$$

wherein H is the height (e.g., thickness) 210 and W is the width (e.g., longest axis) 208. Suitable hybrid separators 26 for use in lithium-ion batteries 20 of the present technology may have aspect ratios ranging from less than or equal to about 1, optionally less than or equal to about 0.5, optionally less than or equal to about 0.1, and in certain aspects, less than or equal to about 0.01, for example.

The method for forming a hybrid separator (e.g., 26 and 200) may include forming a sheet or film by pressing an ionically conductive material comprising a first metal-organic framework (MOF) having a plurality of first pores and a second metal-organic framework (MOF) having a plurality of second pores. The one or more lithium salts are adsorbed in at least one of the plurality of first pores, the plurality of second pores, or the plurality of third pores. In certain instances, as described above, the first metal-organic framework (MOF) may include copper (Cu) and the second metal-organic framework (MOF) may include indium (In). More particularly, the first metal-organic framework (MOF) may include $Cu_3btc_2$ (HKUST-1) and the second metal-organic framework may include $(In_3O)(OH)$ $(ADC)_2(In)_2$. In other instances, also described above, the first metal-organic framework (MOF) may include copper (Cu) and the second metal-organic framework (MOF) may include zinc (Zn). More particularly, the first metal-organic framework (MOF) may include $Cu_3btc_2$ (HKUST-1) and the second metal-organic framework may include $Zn_4O(BDC)_3$ (MOF-5; IRMOF-1).

In various instances, the method includes first forming a precursor material by combining or mixing a plurality of first particles of the first metal-organic framework (MOF) and a plurality of second particles of the second metal-organic framework (MOF). The precursor material may be subsequently dried and press to form the hybrid separator 26 having a conductivity greater than or equal to about 0.1 mS/cm to less than or equal to about 1 mS/cm, greater than or equal to about 0.1 mS/cm to less than or equal to about 1 mS/cm, optionally greater than or equal to about 0.2 mS/cm to less than or equal to about 1 mS/cm, optionally greater than or equal to about 0.2 mS/cm to less than or equal to about 0.93 mS/cm, optionally greater than or equal to about 0.2 mS/cm to less than or equal to about 0.8 mS/cm, and in certain aspects, greater than or equal to about 0.25 and less than or equal to about 0.76 mS/cm. For example, the precursor material may be pressed and consolidated using a force of greater than or equal to about 1,000 psi to less than or equal to about 10,000 psi.

In certain instances, the plurality of first particles and the plurality of second particles may be combined or mixed in dry form and subsequently soaked in an electrolyte (e.g., 30) comprising one or more lithium salts in one or more solvents to form the precursor material The one or more lithium salts may be selected from the group consisting of: lithium tetrafluoroborate ($LiBF_4$), lithium perchlorate ($LiClO_4$), and combinations thereof. The one or more solvents may be selected from the group consisting of: propylene carbonate (PC), ethylene carbonate (EC), dimethyl carbonate (DMC), diethyl carbonate (DEC), fluoroethylene carbonate (FEC), dimethoxyethane (DME), dioxolane, and combinations thereof. The precursor material may then be dried and pressed to densify and shape the hybrid separator (e.g., 26 and 200), desirably increasing the bulk density of the precursor material without substantially compromising the structural integrity of the material.

In other instances, the plurality of first particles may be soaked in a first electrolyte (e.g., 30) comprising one or more lithium salts in one or more solvents. The one or more lithium salts may be selected from the group consisting of: lithium tetrafluoroborate ($LiBF_4$), lithium perchlorate ($LiClO_4$), and combinations thereof. The one or more solvents may be selected from the group consisting of: propylene carbonate (PC), ethylene carbonate (EC), dimethyl carbonate (DMC), diethyl carbonate (DEC), fluoroethylene carbonate (FEC), dimethoxyethane (DME), dioxolane, and combinations thereof. Each lithium salt may have a respective anion volume less than an average pore diameter of the plurality of first pores. The plurality of second particles may be soaked in a second electrolyte (e.g., 30) comprising one or more one or more lithium salts in one or more solvents. The one or more lithium salts may be selected from the group consisting of: lithium tetrafluoroborate ($LiBF_4$), lithium perchlorate ($LiClO_4$), and combinations thereof. The one or more solvents may be selected from the group consisting of: propylene carbonate (PC), ethylene carbonate (EC), dimethyl carbonate (DMC), diethyl carbonate (DEC), fluoroethylene carbonate (FEC), and combinations thereof. Each lithium salt may have a respective anion volume less than an average pore diameter of the plurality of second pores. The pre-soaked plurality of first particles and the pre-soaked plurality of second particles may be subsequently combined or mixed to form the precursor material. The precursor material may then be dried and pressed to densify and shape the hybrid separator (e.g., 26 and 200). Pre-soaking the first and second particles may improve the structural stability of the particles throughout the subsequent mixing and densifying processes.

Embodiments of the present technology are further illustrated through the following non-limiting example.

EXAMPLE 1

Figure 3:
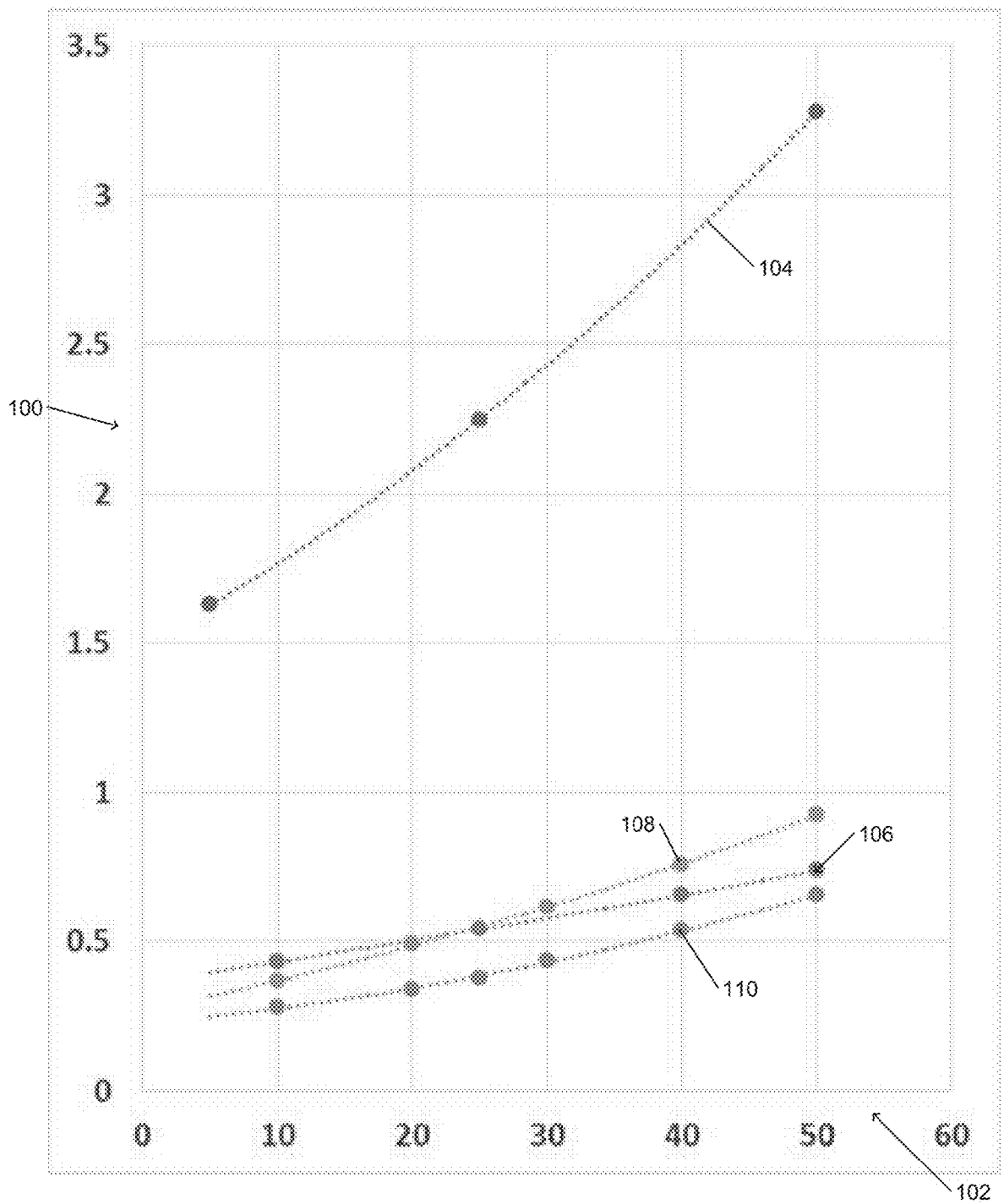
FIG. 3 is a graphical illustration of the conductivities (mS/cm) per temperature (° C.) of example hybrid separators prepared in accordance with certain aspects of the present disclosure.

FIG. 3 compares the conductivities per temperature of hybrid separators 106 and 108 prepared in accordance with certain aspects of the present disclosure; substantially homogeneous separator 110; and electrolyte system 104. The first or vertical y-axis 100 depicts conductivity in millisiemens per centimeter (mS/cm), and the second or horizontal x-axis 102 depicts temperature in degrees Celsius (° C.). Electrolyte 104 is a 1M solution of tetrafluoroborate ($LiBF_4$) in co-solvents fluoroethylene carbonate (FEC) and dimethyl carbonate (DMC).

The hybrid separator 106 includes a first metal-organic framework (MOF) comprising $Cu_3btc_2$ (HKUST-1) and having plurality of first internal pores and a second metal-organic framework (MOF) comprising $(In_3O)(OH)$ $(ADC)_2(In)_2$ and having a plurality of second internal pores. The hybrid separator 106 includes greater than or equal to about 30 wt. % to less than or equal to about 80 wt. % of $Cu_3btc_2$ (HKUST-1) and greater than or equal to about 30 wt. % to less than or equal to about 80 wt. % of $(In_3O)(OH)$ $(ADC)_2(In)_2$ and adsorbs greater than or equal to about 10 wt. % to less than or equal to about 85 wt. % of the tetrafluoroborate ($LiBF_4$) of electrolyte 104 into at least one of the plurality of first pores or the plurality of second pores so as to be ionically conductive. The first metal-organic framework (MOF) comprising $Cu_3btc_2$ (HKUST-1) has a first total internal pore volume of about $$0.617 \frac{cm^3}{g} \pm 20\%$$

and the second metal-organic framework (MOF) comprising $(In_3O)(OH)$ $(ADC)_2(In)_2$ as a second internal pore volume of about $$0.66 \frac{cm^3}{g} \pm 20\%.$$

Substantially all of the internal pores of the first metal-organic framework (MOF) and the second metal-organic framework (MOF) are filled by the tetrafluoroborate (LiBF$_4$), for example, greater than or equal to about 85%.

The hybrid separator 108 includes a first metal-organic framework (MOF) comprising Cu$_3$btc$_2$ (HKUST-1) and having plurality of first internal pores and a second metal-organic framework (MOF) comprising Zn$_4$O(BDC)$_3$ (MOF-5; IRMOF-1) and having a plurality of second internal pores. The hybrid separator 108 includes greater than or equal to about 30 wt. % to less than or equal to about 80 wt. % of Cu$_3$btc$_2$ (HKUST-1) and greater than or equal to about 30 wt. % to less than or equal to about 80 wt. % of Zn$_4$O(BDC)$_3$ (MOF-5; IRMOF-1) and adsorbs greater than or equal to about 10 wt. % to less than or equal to about 85 wt. % of the tetrafluoroborate (LiBF$_4$) into at least one of the plurality of first pores or the plurality of second pores so as to be ionically conductive. The first metal-organic framework (MOF) comprising Cu$_3$btc$_2$ (HKUST-1) has a first total internal pore volume of a first total internal pore volume of about $$0.617 \frac{cm^3}{g} \pm 20\%$$

and the second metal-organic framework (MOF) comprising Zn$_4$O(BDC)$_3$ (MOF-5; IRMOF-1) has a second internal pore volume of about $$1.3 \frac{cm^3}{g} \pm 20\%.$$

Substantially all of the pores of the first metal-organic framework (MOF) and the second metal-organic framework (MOF) are filled by the tetrafluoroborate (LiBF$_4$), for example, greater than or equal to about 85%.

The substantially homogenous separator 110 includes a metal-organic framework (MOF) comprising Cu$_3$btc$_2$ (HKUST-1) and having a plurality of pores. The metal-organic framework (MOF) comprising Cu$_3$btc$_2$ (HKUST-1) has a total internal pore volume of about $$0.617 \frac{cm^3}{g} \pm 20\%$$

and substantially all of the pores of the metal-organic framework (MOF) are filled by the tetrafluoroborate (LiBF$_4$). As illustrated, hybrid separators 106 and 108 have improved conductivity as compared to homogenous separator 110 at all temperatures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid separator for an electrochemical cell that cycles lithium ions, the hybrid separator in a sheet form comprising a first metal-organic framework (MOF) comprising copper (Cu) and having a plurality of first pores and a second distinct metal-organic framework (MOF) comprising indium (In) or zinc (Zn) and having a plurality of second pores, wherein the hybrid separator is capable of adsorbing one or more lithium salts in at least one of the plurality of first pores or the plurality of second pores so as to be ionically conductive, wherein the hybrid separator is free of binder materials that are configured to provide mechanical stability, and wherein at least one of the first metal-organic framework (MOF) and the second metal-organic framework (MOF) maintains a cohesive shape in independent form.

2. The hybrid separator of claim 1, wherein the hybrid separator comprises greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF), and
wherein the hybrid separator adsorbs greater than or equal to about 10 wt. % to less than or equal to about 85 wt. % of the one or more lithium salts.

3. The hybrid separator of claim 1, wherein the one or more lithium salts comprises a first lithium salt and a second lithium salt and the plurality of first pores adsorb the first lithium salt and the plurality of second pores adsorb the second distinct lithium salt.

4. The hybrid separator of claim 1, wherein the one or more lithium salts is selected from the group consisting of: lithium tetrafluoroborate (LiBF$_4$), lithium perchlorate (LiClO$_4$), and combinations thereof, and wherein at least one of the one or more lithium salts has an anion volume less than an average pore diameter of at least one of the plurality of first pores or the plurality of second pores.

5. The hybrid separator of claim 4, wherein greater than or equal to about 85 volume % of the plurality of first pores is filled by the one or more lithium salts.

6. The hybrid separator of claim 1, wherein the hybrid separator including one or more adsorbed lithium salts has a conductivity greater than or equal to about 0.1 mS/cm to less than or equal to about 1 mS/cm.

7. The hybrid separator of claim 1, wherein the first metal-organic framework (MOF) comprises Cu$_3$btc$_2$ (HKUST-1) and the second metal-organic framework (MOF) comprises one of (In$_3$O)(OH) (ADC)$_2$(In)$_2$, Zn$_4$O (BDC)$_3$ (MOF-5; IRMOF-1), or both (In$_3$O)(OH) (ADC)$_2$ (In)$_2$ and Zn$_4$O(BDC)$_3$ (MOF-5; IRMOF-1).

8. The hybrid separator of claim 1, further comprising a third plurality of pores defined between the first metal-organic framework (MOF) and/or the second metal-organic framework (MOF), wherein the hybrid separator is capable of adsorbing the one or more lithium salts in at least one or the plurality of first pores, the plurality of second pores, or the plurality of third pores so as to be ionically conductive.

9. An electrochemical cell that cycles lithium ion comprising:
a positive electrode;
a negative electrode opposing the positive electrode; and
an ionically conductive separator having a conductivity greater than or equal to about 0.1 mS/cm to less than or equal to about 1 mS/cm disposed therebetween comprising a first metal-organic framework (MOF) comprising copper (Cu) and having a plurality of first pores and a second distinct metal-organic framework (MOF) comprising indium (In) or zinc (Zn) and having a plurality of second pores, wherein at least one of the plurality of first pores or the plurality of second pores comprises one or more adsorbed lithium salts, wherein the hybrid separator is free of binder materials that are configured to provide mechanical stability, and wherein at least one of the first metal-organic framework (MOF) and the second metal-organic framework (MOF) maintains a cohesive shape in independent form.

10. The electrochemical cell of claim 9, wherein the separator comprises greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF), and the separator comprises greater than or equal to about 10 wt. % to less than or equal to about 85 wt. % of the one or more lithium salts, the one or more lithium salts selected from the group consisting of: lithium tetrafluoroborate ($LiBF_4$), lithium perchlorate ($LiClO_4$), and combinations thereof.

11. The electrochemical cell of claim 9, wherein greater than or equal to about 85 volume % of the plurality of first pores is filled by the one or more lithium salts.

12. The electrochemical cell of claim 9, wherein the first metal-organic framework (MOF) comprises $Cu_3btc_2$ (HKUST-1) and the second metal-organic framework (MOF) comprises one of $(In_3O)(OH)$ $(ADC)_2(In)_2$, $Zn_4O(BDC)_3$ (MOF-5; IRMOF-1), or both $(In_3O)(OH)$ $(ADC)_2(In)_2$ and $Zn_4O(BDC)_3$ (MOF-5; IRMOF-1).

13. A method of forming a hybrid separator for an electrochemical cell that cycles lithium ions, the method comprising:

forming a sheet by pressing an ionically conductive material comprising a first metal-organic framework (MOF) comprising copper (Cu) and having a plurality of first pores and a second distinct metal-organic framework (MOF) comprising indium (In) or zinc (Zn) and having a plurality of second pores, wherein one or more lithium salts are adsorbed in at least one of the plurality of first pores or the plurality of second pores, wherein the hybrid separator is free of binder materials that are configured to provide mechanical stability, and wherein at least one of the first metal-organic framework (MOF) and the second metal-organic framework (MOF) maintains a cohesive shape in independent form.

14. The method of claim 13, further comprising forming a precursor material by combining a plurality of first particles of the first metal-organic framework (MOF) comprising copper (Cu) and a plurality of second particles of the second distinct metal-organic framework (MOF) comprising indium (In) or zinc (Zn).

15. The method of claim 14, further comprising soaking the plurality of first particles in a first electrolyte comprising the one or more lithium salts in one or more solvents and soaking the plurality of second particles in a second electrolyte comprising the one or more lithium salts in one or more solvents, and subsequently mixing the pre-soaked plurality of first particles and the pre-soaked plurality of second particles to form the precursor material.

16. The method of claim 14, further comprising mixing the plurality of first particles and the plurality of second particles in a dry form and subsequently soaking the mixture in an electrolyte comprising the one or more lithium salts in one or more solvents to form the precursor material.

17. The method of claim 14, further comprising drying the precursor material and pressing the dried mixture to densify and shape the hybrid separator using a force greater than or equal to about 1,000 psi to less than or equal to about 10,000 psi is applied during pressing.

18. The method of claim 13, wherein the hybrid separator is substantially free of any polymeric binder and comprises greater than or equal to about 30 wt. % to less than or equal to about 80 wt. % of the first metal-organic framework (MOF) and greater than or equal to about 30 wt. % to less than or equal to about 80 wt. % of the second metal-organic framework (MOF), and greater than or equal to about 85 volume % of the plurality of first pores is filled by the one or more lithium salts.

\* \* \* \* \*